(12) United States Patent
Imamura

(10) Patent No.: US 11,586,156 B2
(45) Date of Patent: Feb. 21, 2023

(54) ELECTRONIC DEVICE, CONTROL METHOD, AND STORAGE MEDIUM FOR CONTROLLING A DISPLAY MODE OF DISPLAYED INFORMATION BASED ON A DISPLAY REGION THEREOF

(71) Applicant: CASIO COMPUTER CO., LTD., Tokyo (JP)

(72) Inventor: Keiichi Imamura, Hamura (JP)

(73) Assignee: CASIO COMPUTER CO., LTD., Tokyo (JP)

(*) Notice: Subject to any disclaimer, the term of this patent is extended or adjusted under 35 U.S.C. 154(b) by 65 days.

(21) Appl. No.: 17/178,324

(22) Filed: Feb. 18, 2021

(65) Prior Publication Data
US 2021/0294276 A1   Sep. 23, 2021

(30) Foreign Application Priority Data

Mar. 23, 2020 (JP) .............................. JP2020-051296

(51) Int. Cl.
| | | |
|---|---|---|
| G04G 21/02 | (2010.01) | |
| G06F 1/16 | (2006.01) | |
| G06F 3/04817 | (2022.01) | |
| G04G 21/08 | (2010.01) | |
| G04G 9/02 | (2006.01) | |

(52) U.S. Cl.
CPC .......... G04G 21/025 (2013.01); G04G 9/025 (2013.01); G04G 21/08 (2013.01); G06F 1/163 (2013.01); G06F 3/04817 (2013.01)

(58) Field of Classification Search
CPC .................................................. G04G 21/025
See application file for complete search history.

(56) References Cited

U.S. PATENT DOCUMENTS

| | | | |
|---|---|---|---|
| 9,959,035 B2 | 5/2018 | Yoo et al. | |
| 10,248,227 B2 | 4/2019 | Matsuno et al. | |
| 2015/0186030 A1* | 7/2015 | Yoo ........................ | G06F 1/163 |
| | | | 715/857 |
| 2017/0115752 A1* | 4/2017 | Matsuno ................ | G01C 17/28 |
| 2019/0339860 A1* | 11/2019 | Chen ........................ | G06F 3/048 |
| 2021/0349611 A1* | 11/2021 | Chen ..................... | G04G 21/025 |

FOREIGN PATENT DOCUMENTS

| | | |
|---|---|---|
| JP | S61072697 U | 5/1986 |
| JP | 2008175800 A | 7/2008 |
| JP | 2015127957 A | 7/2015 |
| JP | 2017083978 A | 5/2017 |

OTHER PUBLICATIONS

Japanese Office Action (and English language translation thereof) dated Apr. 5, 2022, issued in Japanese Application No. 2020-051296.
Tanaka, a complete dictionary of a simple PLUS+ Apple Watch, pp. 22-23.

* cited by examiner

*Primary Examiner* — Roland J Casillas
(74) *Attorney, Agent, or Firm* — Holtz, Holtz & Volek PC

(57) ABSTRACT

An electronic device includes a non-rectangular display, an information acquisition sensor, and a processor. The processor allocates information acquired from the information acquisition sensor to any of a plurality of display regions having different sizes or shapes within a display range. The information is displayed on the display in a different display mode depending on whether the information is allocated to a first display region or to a separate display region out of the plurality of display regions.

12 Claims, 10 Drawing Sheets

FIG. 12

| No. | PART | ITEM NAME | RIM PART | | |
|---|---|---|---|---|---|
| | | | UPPER STAGE | MIDDLE STAGE | LOWER STAGE |
| 1 | UPPER STAGE | STEPS/HEART RATE/CALORIE UPPER STAGE IMAGE 211 | OCCUPIED | | |
| 2 | MIDDLE STAGE | COLLISION HEART RATE MIDDLE STAGE IMAGE 212 | OCCUPIED | OCCUPIED | OCCUPIED |
| 3 | LOWER STAGE | TIME LOWER STAGE IMAGE 213 | | | OCCUPIED |
| 4 | LOWER STAGE | STEPS/HEART RATE/CALORIE LOWER STAGE IMAGE 214 | | | OCCUPIED |
| 5 | MIDDLE STAGE | COLLISION AVOIDANCE HEART RATE MIDDLE STAGE IMAGE 222 | | | |
| 6 | UPPER STAGE | GRAPH HEART RATE UPPER STAGE IMAGE 231 | OCCUPIED | | |
| 7 | LOWER STAGE | GRAPH HEART RATE LOWER STAGE IMAGE 232 | | | OCCUPIED |

… (1) …

ELECTRONIC DEVICE, CONTROL METHOD, AND STORAGE MEDIUM FOR CONTROLLING A DISPLAY MODE OF DISPLAYED INFORMATION BASED ON A DISPLAY REGION THEREOF

CROSS-REFERENCE TO RELATED APPLICATIONS

The present application is based on and claims priority to Japanese Patent Application No. 2020-051296, filed on Mar. 23, 2020, in the Japan Patent Office, the entire content of which is incorporated herein by reference.

The present technical field relates to an electronic device, an electronic device control method, and a storage medium.

BACK GROUND

For example, JP 2015-127957A, which has been filed for a patent in Japan, discloses a technique for dividing a display range of a display into a plurality of regions and displaying information in each of the regions.

SUMMARY

The present embodiment includes a display configured to perform display in a non-rectangular display range, an information acquisition sensor, and at least one processor. The processor allocates information acquired from the information acquisition sensor to any of a plurality of display regions having different sizes or shapes within the display range, and the information is displayed on the display in a different display mode depending on whether the information is allocated to a first display region or to a separate display region out of the plurality of display regions.

Note that signs and characters in parentheses are signs and the like assigned in an embodiment and do not limit the present invention.

BRIEF DESCRIPTION OF THE DRAWINGS

FIG. 12 is a diagram illustrating an example of an item management table;

DETAILED DESCRIPTION

Figure 1:
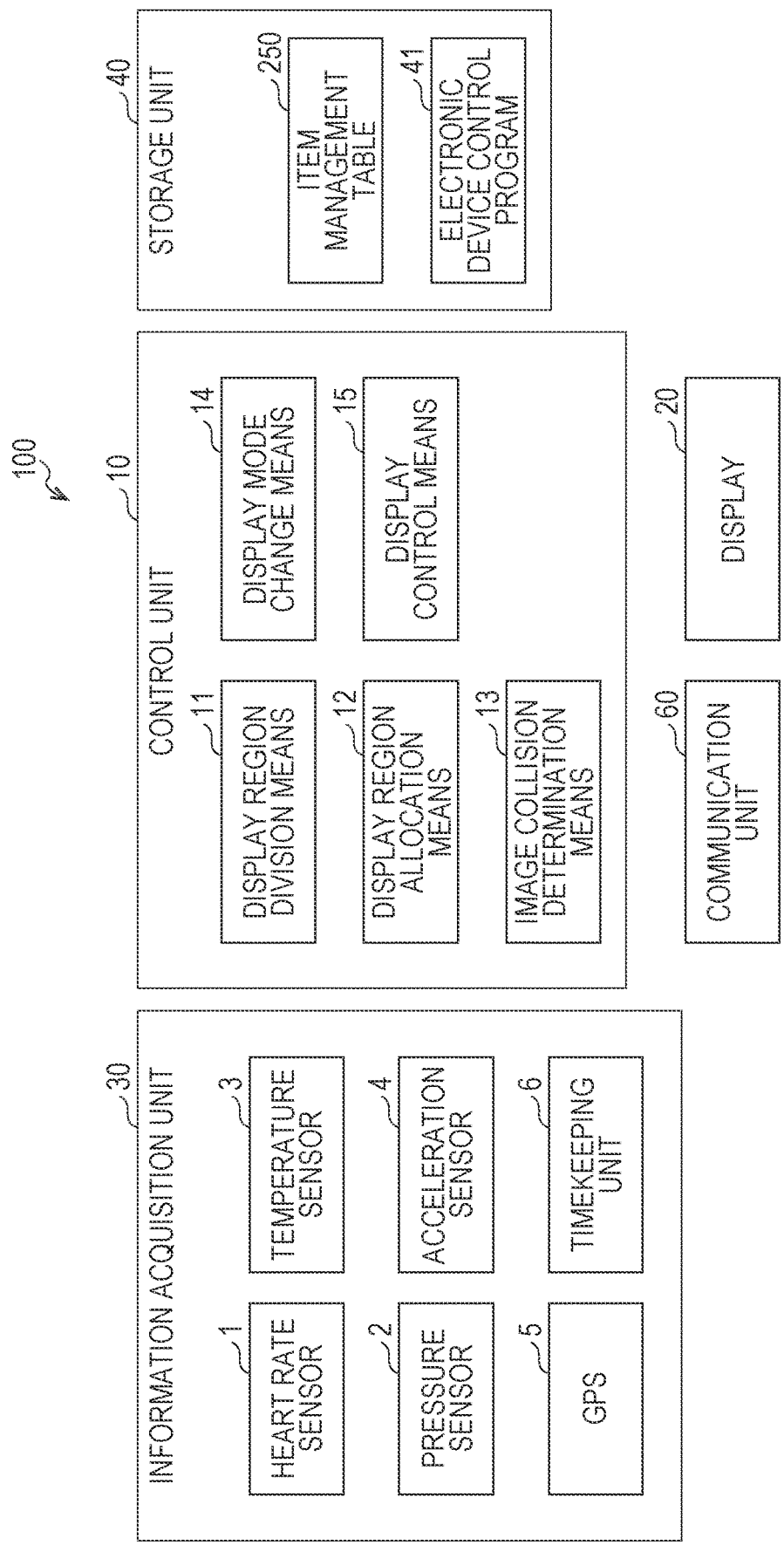
FIG. 1 is a configuration diagram of an electronic device according to the present embodiment.

Hereinbelow, an embodiment will be described in detail with reference to the drawings. Note that the drawings are merely schematically illustrated to the extent that the present embodiment can fully be understood. Also, in the drawings, similar or identical components are labeled with the same reference signs, and description of the duplicate components is omitted.

Embodiment

FIG. 1 is a configuration diagram of an electronic device according to the present embodiment.

An electronic device 100 is a wristwatch-type mobile device (smart watch) that a user wears on his/her wrist. The electronic device 100 includes a control unit 10, a display 20, an information acquisition sensor 30, a storage unit 40, and a communication unit 60. The storage unit 40 has stored therein an item management table 250 and an electronic device control program 41, which will be described below. The communication unit 60 wirelessly communicates with an external control device (for example, a personal computer (PC) or a smartphone).

Figure 2:
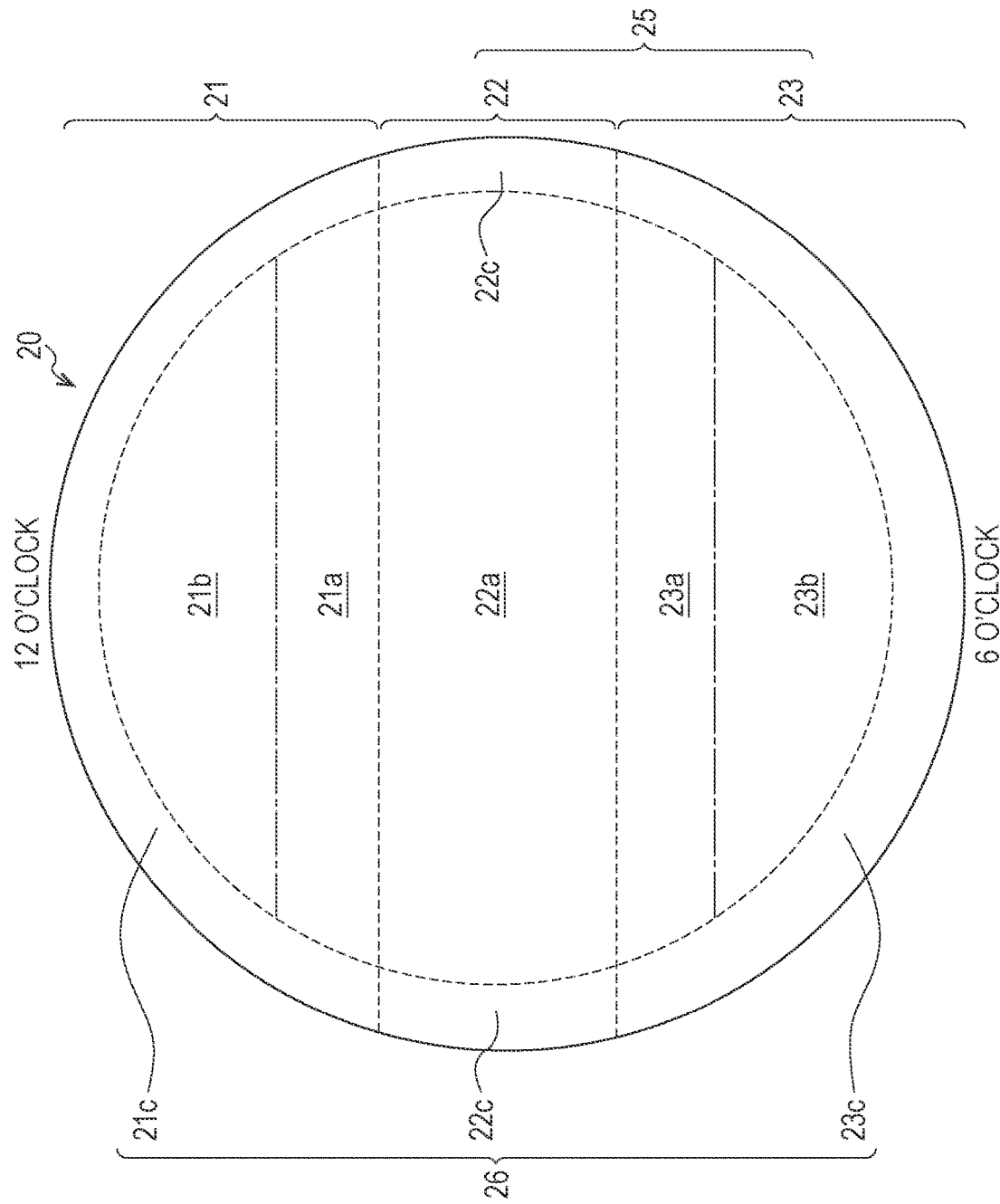
FIG. 2 is a diagram illustrating an example of a divided region in which the display range of a display of the electronic device according to the present embodiment is divided.

The display 20 is a liquid crystal display device having a circular display range as illustrated in FIG. 2. Note that the display range of the display 20 does not have to be circular. The information acquisition sensor 30 includes a heart rate sensor 1, a pressure sensor 2, a temperature sensor 3, an acceleration sensor 4, a global positioning system (GPS) 5, and a timekeeping unit 6, for example.

The heart rate sensor 1 measures the heart rate per minute (beats per minute (BPM)) of the wearer wearing the electronic device 100. The pressure sensor 2 is a sensor measuring atmospheric pressure, and altitude information can be obtained from the measured atmospheric pressure, for example. The temperature sensor 3 is a sensor measuring atmospheric temperature. The acceleration sensor 4 is a sensor detecting acceleration, and the user's step count information can be obtained from the measured acceleration, for example. The GPS 5 is a unit receiving radio waves from satellites to obtain positional information. The timekeeping unit 6 keeps time.

The control unit 10 is a central processing unit (CPU) and executes the electronic device control program 41 and an operating system (OS) to fulfill the functions of a display region division means 11, a display region allocation means 12, an image collision determination means 13, a display mode change means 14, and a display control means 15.

The display region division means 11 divides a circular display range of the display 20 into a plurality of display regions. For example, as illustrated in FIG. 2, the display region division means 11 divides the display range into a first display region 21 and a separate display region 25. Here, the separate display region 25 is divided into a second display region 23 and a third display region 22. That is, the display region division means 11 divides the display range into the first display region 21, the second display region 23, and the third display region 22. The first display region 21 occupies an upper stage (12 o'clock side) of the circular display range, the second display region 23 occupies a lower stage (6 o'clock side), and the third display region 22 occupies a middle stage.

Also, the circular display range includes a rim part 26. The rim part 26 is divided into a first rim part 21c, a second rim part 23c, and right and left third rim parts 22c and 22c. Here, the first rim part 21c is included in the first display region 21, the second rim part 23c is included in the second display region 23, and the third rim parts 22c and 22c are included in the third display region 22.

In the first display region 21, a graphic element such as a graph and a gauge is often displayed at the lower part, and related information to the graphic element is often displayed with characters and numbers at the upper part, for example. That is, the first display region 21 is divided into a graphic region 21a, in which a graphic element is often displayed, and a related information region 21b, in which related information to the graphic element is often displayed. Here, the graphic region 21a is arranged farther from the first rim part 21c than the related information region 21b. The graphic element requires a display area of a certain size due to the nature of the graphic element when displayed. For this reason, in a case in which the graphic element is displayed near the first rim part 21c, the graphic element must be displayed in a small size. However, in a case in which the graphic element is displayed far from the first rim part 21c, the graphic element can be kept in a large size.

Also, the display area of the related information to the graphic element is often smaller than that of the graphic element. Therefore, the related information to the graphic element can be kept in a display size enabling the user to sufficiently check the related information even in a case in which the related information is displayed near the first rim part 21c. That is, by arranging and displaying the graphic element and the related information to the graphic element in accordance with the shape of the first display region 21, the display area can effectively be utilized.

For example, in a case in which the user wearing the electronic device 100 is running, it is assumed that a heart rate, running time, a step count, calorie consumption, and the like are displayed. The user can display information to be checked during running in the first display region 21, the second display region 23, and the third display region 22. Note that information to be displayed in the first display region 21, the second display region 23, and the third display region 22 may automatically be determined by selecting a preset measurement mode such as a running measurement mode. For example, in a case in which information about the step count, information about the heart rate, and the calorie consumption are displayed in the first display region 21, a steps/heart rate/calorie upper stage image 211 (FIG. 3) is displayed. The steps/heart rate/calorie upper stage image 211 (FIG. 3) includes a calorie gauge 211b, a step count gauge 211d, and a step count number element 211c in the graphic region 21a (FIG. 2). Also, a heart rate number element 211a is displayed in the related information region 21b (FIG. 2). In a case in which three or more types of information are displayed in the first display region 21 or the second display region 23 as in the steps/heart rate/calorie upper stage image 211, the number of pieces of information to be displayed in the graphic region 21a or the graphic region 23a having a large display area is preferably increased.

Also, in the second display region 23, a graphic element is often displayed at the upper part, and related information to the graphic element is often displayed with characters and numbers at the lower part, for example. That is, the second display region 23 is divided into a graphic region 23a, in which a graphic element is often displayed, and a related information region 23b, in which related information to the graphic element is often displayed. Here, the graphic region 23a is arranged farther from the second rim part 23c than the related information region 23b. That is, in a case in which the graphic element is displayed far from the second rim part 23c, the graphic element can be kept in a large display size. Also, the related information to the graphic element can be kept in a display size enabling the user to sufficiently check the related information even in a case in which the related information is displayed near the second rim part 23c. That is, by arranging and displaying the graphic element and the related information to the graphic element in accordance with the shape of the second display region 23, the display area can effectively be utilized.

Figure 3:
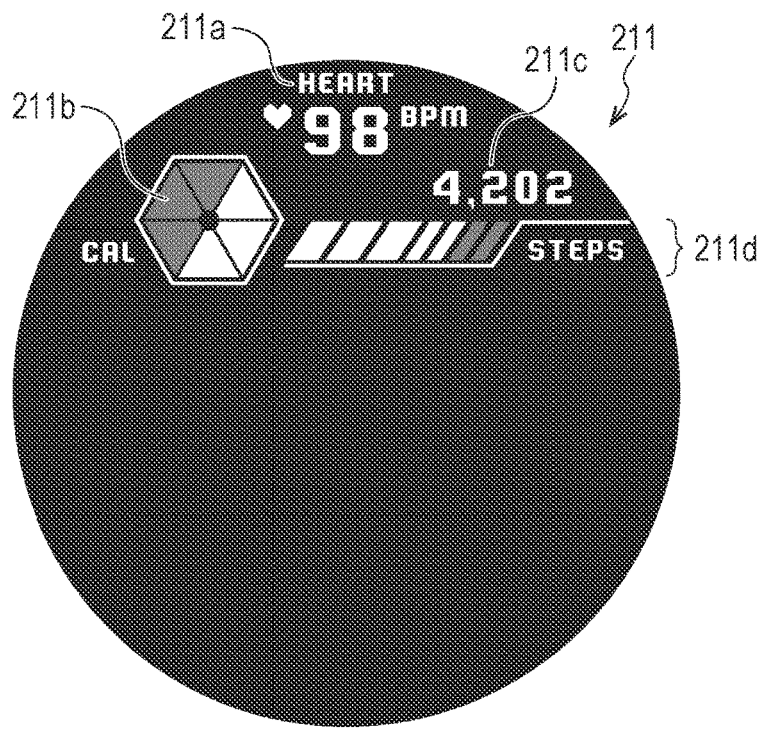
FIG. 3 is a diagram illustrating an example of an upper stage image.
Figure 4:
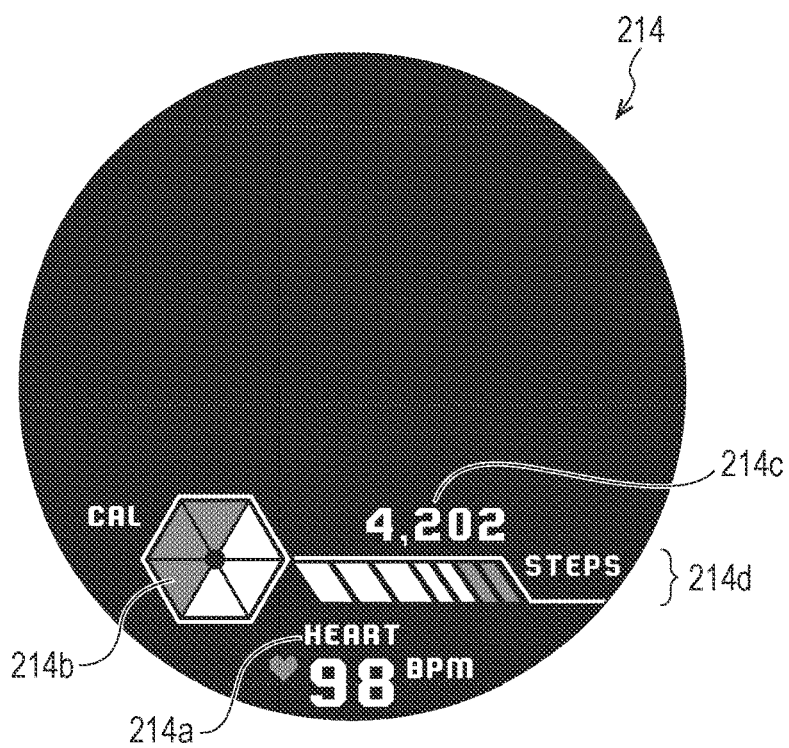
FIG. 4 is a diagram (1) illustrating an example of a lower stage image.

For example, a steps/heart rate/calorie lower stage image 214 illustrated in FIG. 4 includes a calorie gauge 214b, a step count gauge 214d, and a step count number element 214c in the graphic region 23a (FIG. 2). Also, a heart rate number element 214a is displayed in the related information region 23b (FIG. 2). In the cases of FIGS. 3 and 4, the first display region 21 and the second display region 23 are vertically symmetrical in terms of arrangement of the components thereof. As described above, since the display modes are changed by changing the arrangements of the components in accordance with the display positions of the pieces of information having the same graphic elements and the same pieces of related information, the user can easily recognize the information.

Note that, in the present embodiment, since the information about the step count and the information about the heart rate are displayed in the first display region 21, other information may be displayed in the second display region 23. For example, a time lower stage image 213 (FIG. 5) showing the running time of the user is displayed in the second display region 23. In the time lower stage image 213, cumulative time 213a from start time is displayed in the upper stage, and total cumulative time including time before the start is displayed in the lower stage. Here, the start time is start time of running, for example, and accumulation is started when a not-illustrated button is pressed.

In the third display region 22, a graphic element is often displayed. The third display region 22 easily catches the user's attention since the third display region 22 is located at the center of the display range and preferably displays relatively simple information to enable the user to obtain the information instantly. In the third display region 22, a collision heart rate middle stage image 212 (FIG. 6) showing information about the heart rate is displayed, for example. The collision heart rate middle stage image 212 includes a heart rate number element 212a and a heart rate gauge 212b. Note that, without particular limitation, in a case in which the information about the heart rate is also displayed in the first display region 21 as in the present embodiment, different information from that in the first display region 21 is preferably displayed. For example, different pieces of information out of an average value, a maximum value, and a minimum value of the heart rate, a current heart rate, and the like may be displayed in the first display region 21, the second display region 23, and the third display region 22.

Figure 7:
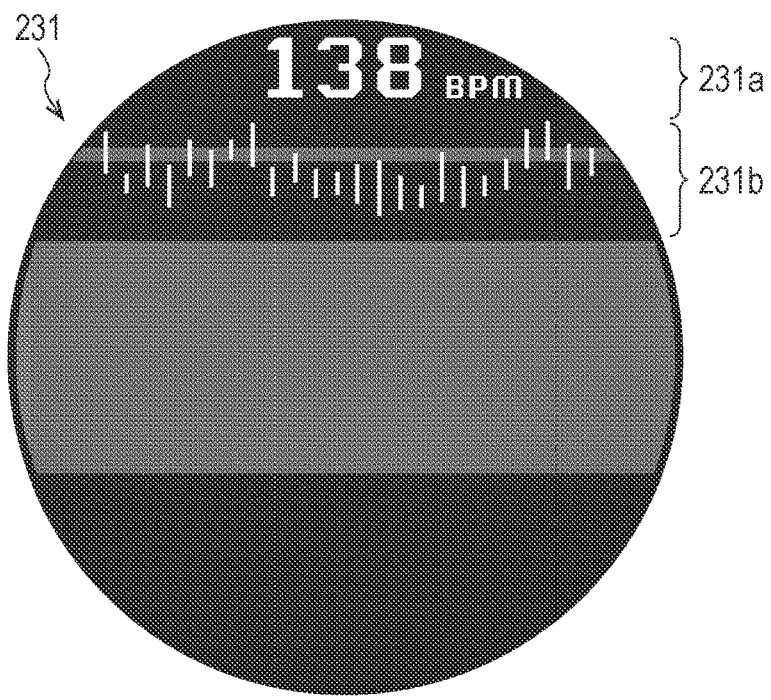
FIG. 7 is an example of the upper stage image in which a graphic element and related information are arranged.
Figure 8:
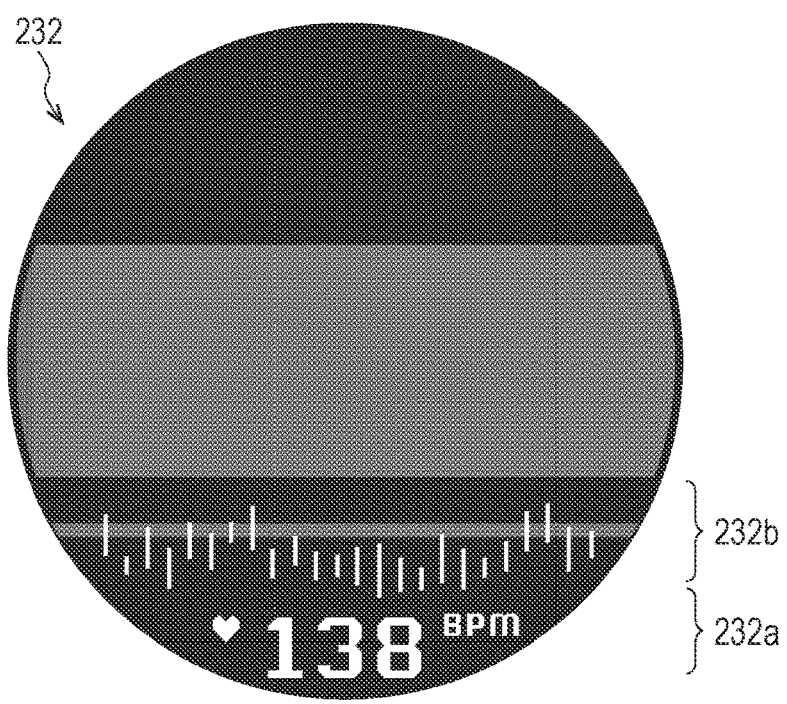
FIG. 8 is an example of the lower stage image in which a graphic element and related information are arranged.

Also, the graphic elements displayed at the lower part of the first display region 21 and the upper part of the second display region 23 are often graphs as illustrated in FIGS. 7 and 8. In a graph heart rate upper stage image 231 (FIG. 7), a heart rate number element 231a is arranged at the upper part, and a heart rate graph 231b is arranged at the lower part. In a graph heart rate lower stage image 232 (FIG. 8), a heart rate graph 232b is arranged at the upper part, and a heart rate number element 232a is arranged at the lower part. That is, the graph heart rate upper stage image 231 displayed in the upper stage and the graph heart rate lower stage image 232 displayed in the lower stage are vertically symmetrical in terms of arrangement. Also, heart rate information including past heart rate information is displayed in the heart rate graph 231b and the heart rate graph 232b, and current heart rate information is displayed in the heart rate number element 231a and the heart rate number element 232a.

Figure 6:
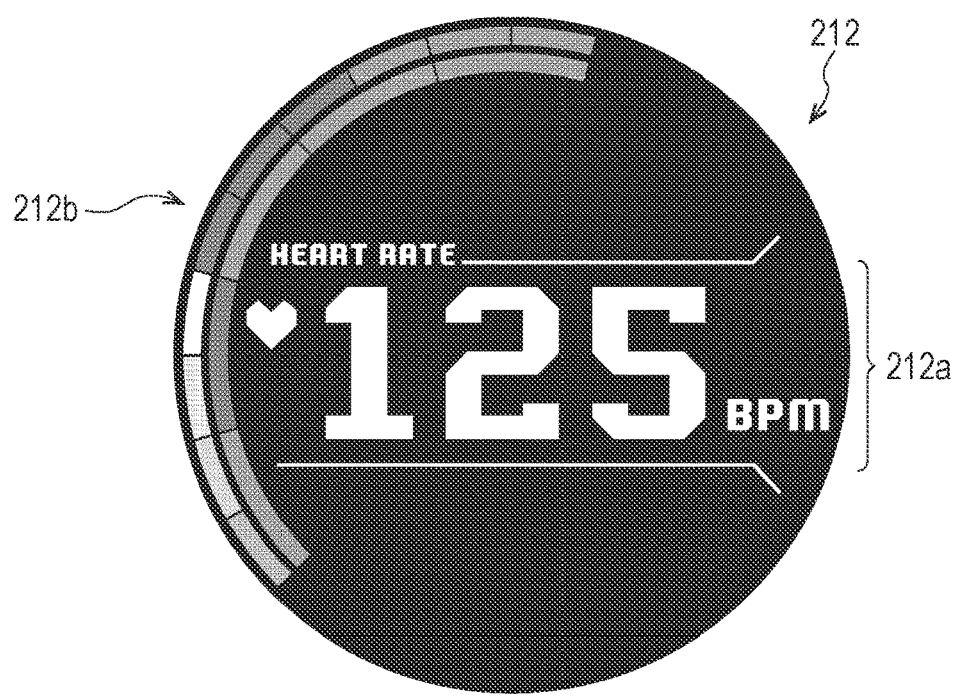
FIG. 6 is a diagram illustrating an example of a middle stage image.

Further, the graphic element displayed in the third display region 22 often includes a gauge as illustrated in FIG. 6. While the graph provides a large amount of information because the graph shows changes of the value, the gauge provides a small amount of information and is simple because the gauge shows one value at a certain time point. Therefore, the gauge is suitable for being displayed in the third display region 22. Also, the image displayed in the third display region 22, such as the heart rate gauge 212b in FIG. 6, may protrude into the first rim part 21c and the second rim part 23c. Although the heart rate gauge 212b protrudes into the first rim part 21c and the second rim part 23c, the heart rate gauge 212b is arranged mainly in the third display region 22, in which simple information is arranged.

Note that the first display region 21 and the second display region 23 are positions that are not suitable to let the user instantly recognize information displayed therein. Therefore, the first display region 21 and the second display region 23 preferably display a large amount of information so that the user can obtain detailed information when the user closely looks at the screen. Accordingly, the first display region 21 and the second display region 23 often display graphs.

The display region allocation means 12 (FIG. 1) allocates the information acquired in the information acquisition sensor 30 (FIG. 1) to any display region. The display region allocation means 12 allocates an image of a predetermined display mode to any of the first display region 21, the second display region 23, and the third display region 22 in accordance with the operation of the user. For example, in accordance with the operation of the user, the display region allocation means 12 allocates the steps/heart rate/calorie upper stage image 211 (FIG. 3) to the first display region 21 as a step count, calorie consumption, and a heart rate, allocates the collision heart rate middle stage image 212 (FIG. 6) to the third display region 22 as the heart rate, and allocates the time lower stage image 213 (FIG. 5) to the second display region 23 as running time. Note that the display region allocation means 12 may automatically allocate information to an appropriate region without the operation of the user.

The image collision determination means 13 (FIG. 1) determines if the image allocated in the upper stage (first display region 21), the image allocated in the middle stage (third display region 22), and the image allocated in the lower stage (second display region 23) collide (interfere) with each other.

Figure 9:
FIG. 9 is a diagram illustrating an example of a protruding image, in which an image in a certain display region protrudes into another display region.

FIG. 9 illustrates an example of a protruding image, in which an image in a certain display region protrudes into another display region.

A heart rate collision image 210 includes the steps/heart rate/calorie upper stage image 211 (FIG. 3) allocated to the upper stage (first display region 21), the collision heart rate middle stage image 212 (FIG. 6) allocated to the third display region 22, and the time lower stage image 213 (FIG. 5) allocated to the second display region 23.

Here, the collision heart rate middle stage image 212 (FIG. 6) allocated to the third display region 22 (FIG. 2) includes the heart rate number element 212a and the heart rate gauge 212b, and the heart rate gauge 212b uses the first rim part 21c and the second rim part 23c (FIG. 2). That is, the heart rate gauge 212b is displayed so as to protrude into the first display region 21 and the second display region 23.

Therefore, in the heart rate collision image 210 (FIG. 9), the heart rate gauge 212b (FIG. 6) and the calorie gauge 211b (FIG. 3) collide (interfere) at a collision location 215. Also, in the heart rate collision image 210, the heart rate gauge 212b and the character string "CAL" collide (interfere) at a collision location 216. Further, in the heart rate collision image 210, the heart rate gauge 212b and the character string "TIME" collide (interfere) at a collision location 217.

The display mode change means 14 (FIG. 1) changes a display mode or display modes of any one or ones of the image allocated in the first display region 21, the image allocated in the third display region 22, and the image allocated in the second display region 23 to prevent the collision locations 215, 216, and 217 from being generated.

Figure 10:
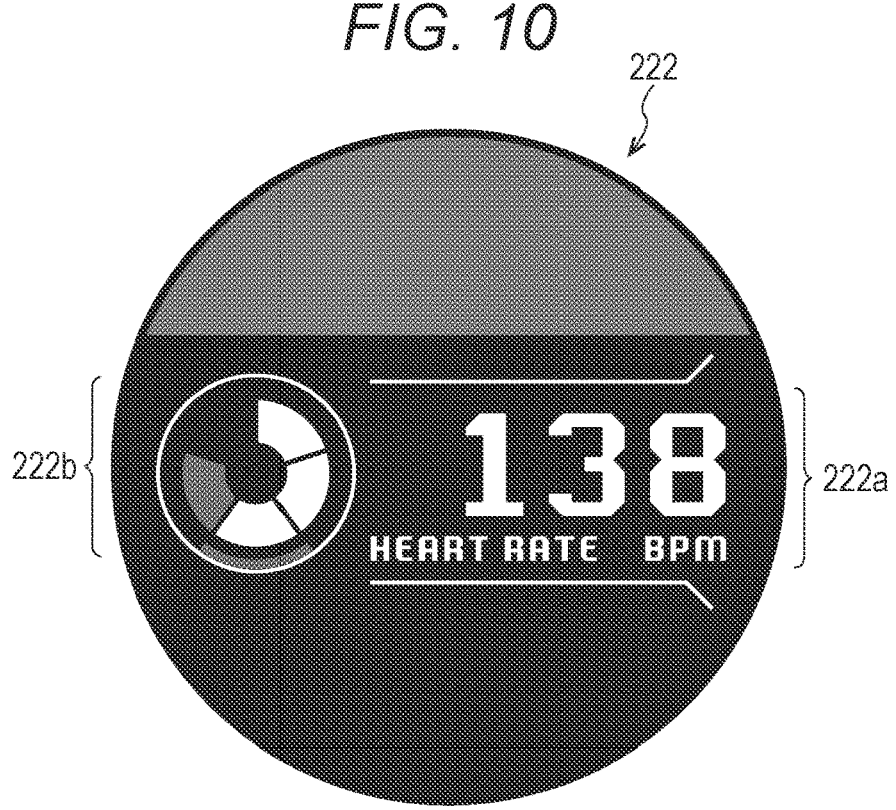
FIG. 10 is a diagram illustrating an example of the middle stage image avoiding protrusion into another display region.

Here, the information displayed in the first display region 21, the third display region 22, and the second display region 23 may be changed to another type of information. Also, the display contents of the first display region 21, the third display region 22, and the second display region 23 may be interchanged. Using these functions, the display mode change means 14 changes the collision heart rate middle stage image 212 (FIG. 6) allocated to the third display region 22 to a collision avoidance heart rate middle stage image 222 (FIG. 10), for example. That is, the display mode change means 14 changes the display mode from the heart rate gauge 212b (FIG. 6) to a heart rate gauge 222b (FIG. 10). The collision avoidance heart rate middle stage image 222 includes a heart rate number element 222a and the heart rate gauge 222b.

Figure 11:
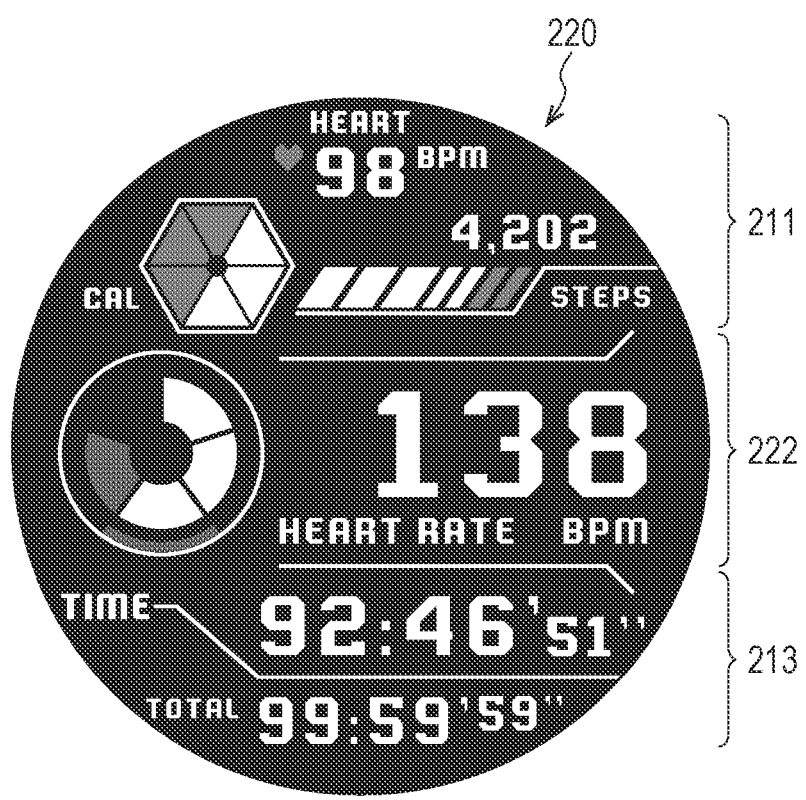
FIG. 11 is a diagram illustrating an example of an avoidance image, in which protrusion into another display region is avoided.

FIG. 11 illustrates an example of an avoidance image, in which protrusion into another display region is avoided.

Figure 5:
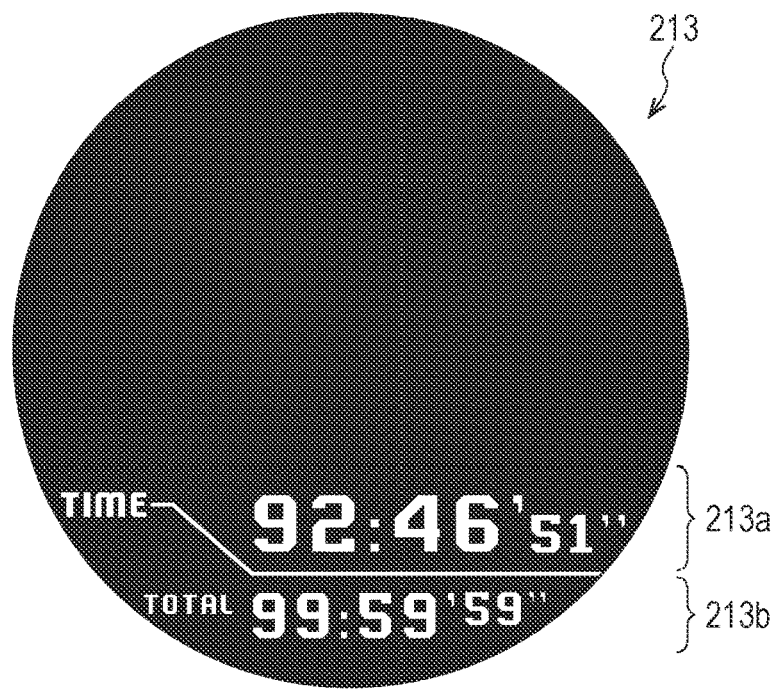
FIG. 5 is a diagram (2) illustrating an example of the lower stage image.

A heart rate collision avoidance image 220 includes a combination of the steps/heart rate/calorie upper stage image 211 (FIG. 3), the collision avoidance heart rate middle stage image 222 (FIG. 10), and the time lower stage image 213 (FIG. 5). Unlike the collision heart rate middle stage image 212 (FIG. 6), the collision avoidance heart rate middle stage image 222 (FIG. 10) is not displayed to protrude into the first display region 21 and the second display region 23.

The image collision determination means 13 (FIG. 1) determines the presence or absence of these collision locations 215, 216, and 217 with use of the item management table 250 illustrated in FIG. 12. Also, the display mode change means 14 selects an image enabling collision avoidance with use of the item management table 250. Hereinbelow, the item management table 250 according to the present embodiment will be described.

The item management table 250 includes a "No." column 250a, a "part" column 250b, an "item name" column 250c, and an upper stage interference column 250d, a middle stage interference column 250e, and a lower stage interference column 250f of the rim part 26 (FIG. 2), for example.

In the "No." column 250a, the serial numbers of the image items are listed. The "part" column 250b represents the parts of the image items (for example, "upper stage", "middle stage", and "lower stage"). In the "item name" column 250c, the names of the image items are shown. The upper stage interference column 250*d*, the middle stage interference column 250*e*, and the lower stage interference column 250*f* represent whether or not the first rim part 21*c* serving as the upper stage of the rim part 26, the third rim part 22*c* serving as the middle stage, and the second rim part 23*c* serving as the lower stage are occupied.

As the image items, the steps/heart rate/calorie upper stage image 211 (FIG. 3), the collision heart rate middle stage image 212 (FIG. 6), the time lower stage image 213 (FIG. 5), the steps/heart rate/calorie lower stage image 214 (FIG. 4), the collision avoidance heart rate middle stage image 222 (FIG. 10), the graph heart rate upper stage image 231 (FIG. 7), and the graph heart rate lower stage image 232 (FIG. 8) are listed, for example.

The steps/heart rate/calorie upper stage image 211 (FIG. 3) is arranged in the "upper stage" of the circular display range and occupies the first rim part 21*c* of the rim part 26. The collision heart rate middle stage image 212 (FIG. 6) is arranged in the "middle stage" and occupies all of the "upper stage", "middle stage", and "lower stage" of the rim part 26. Each of the time lower stage image 213 (FIG. 5) and the steps/heart rate/calorie lower stage image 214 (FIG. 4) is arranged in the "lower stage" and occupies the second rim part 23*c* of the rim part 26.

The collision avoidance heart rate middle stage image 222 (FIG. 10) is arranged in the "middle stage" and does not occupy any of the "upper stage", "middle stage", and "lower stage" of the rim part 26. Also, the graph heart rate upper stage image 231 (FIG. 7) is arranged in the "upper stage" and occupies the "upper stage" of the rim part 26 but does not occupy the "middle stage" and "lower stage". The graph heart rate lower stage image 232 (FIG. 8) is arranged in the "lower stage" and occupies the "lower stage" of the rim part 26 but does not occupy the "upper stage" and "middle stage".

The image collision determination means 13 determines whether or not "occupied" overlaps in each of the "upper stage", "middle stage", and "lower stage" items of the rim part 26 of the selected item (image). For example, the steps/heart rate/calorie upper stage image 211 and the collision heart rate middle stage image 212 differ in terms of "part" but overlap in that the "upper stage" of the rim part is "occupied", and are determined to collide (interfere).

The display mode change means 14 selects, from the plurality of items, items so that "occupied" does not overlap in any of the "upper stage", "middle stage", and "lower stage" of the rim part. For example, the display mode change means 14 selects either the "steps/heart rate/calorie upper stage image 211" or the "graph heart rate upper stage image 231" for the "upper stage" part. The display mode change means 14 selects the "collision avoidance heart rate middle stage image 222", which does not occupy any rim part for the "middle stage" part. The display mode change means 14 selects any of the "time lower stage image 213", the "steps/heart rate/calorie lower stage image 214", and the "graph heart rate lower stage image 232" for the "lower stage" part.

The display control means 15 displays on the display 20 an image in which the display region allocation means 12 has performed allocation to the display regions and in which collision has been avoided due to a change of the display mode by the display mode change means 14.

Figure 13:
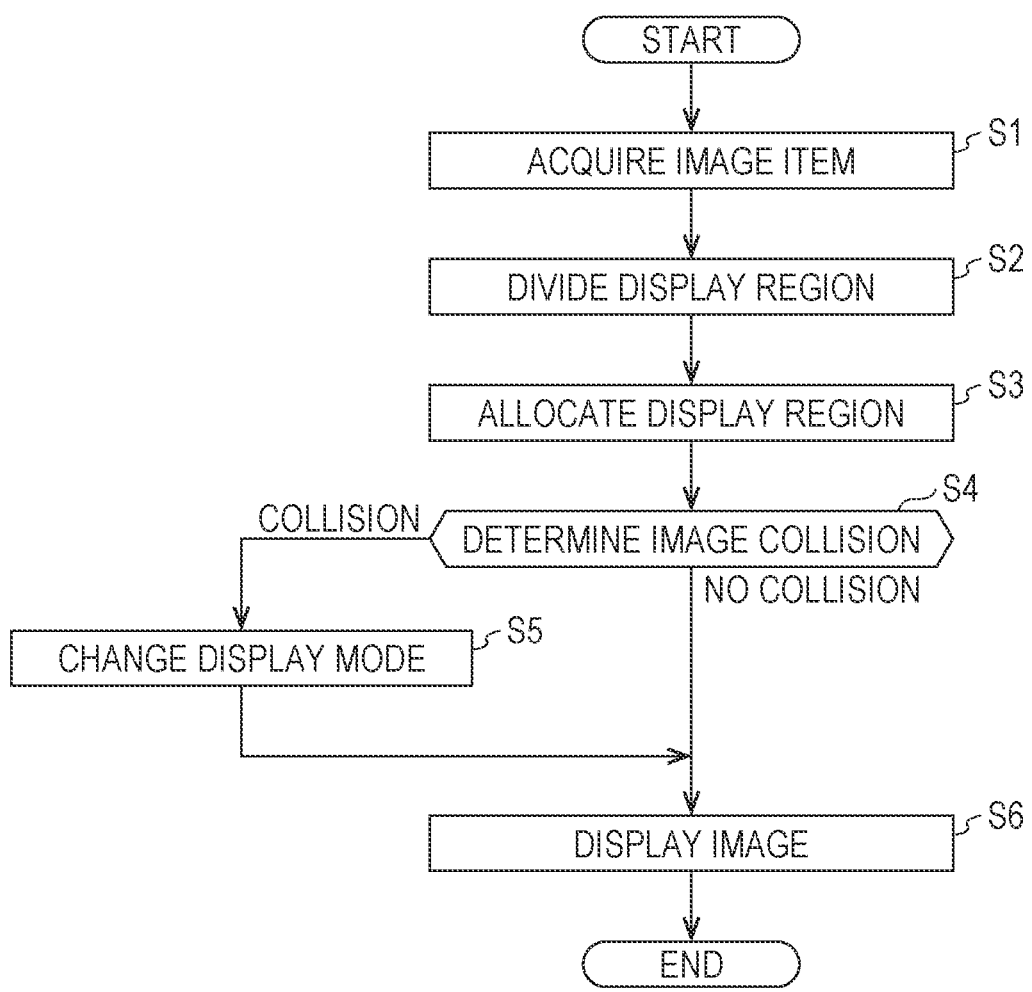
FIG. 13 is a flowchart describing the operation of the electronic device according to the present embodiment.

FIG. 13 is a flowchart for describing the operation of the electronic device according to the present embodiment.

This flow is executed every time the image arrangement setting is changed. The control unit 10 acquires an image item whose setting is to be changed (S1). For example, the control unit 10 acquires the steps/heart rate/calorie upper stage image 211 (FIG. 3), the collision heart rate middle stage image 212 (FIG. 4), and the time lower stage image 213 (FIG. 5). Subsequently, the display region division means 11 divides the display range of the display 20 into a plurality of display regions (S2). For example, the display region division means 11 divides the display range of the display 20 into the first display region 21 (FIG. 2) serving as the upper stage, the third display region 22 serving as the middle stage, and the second display region 23 serving as the lower stage. Note that the order of steps S1 and S2 does not matter.

After the processing in S2, the display region allocation means 12 allocates the image items acquired in S1 to the display regions (S3). For example, the display region allocation means 12 allocates the steps/heart rate/calorie upper stage image 211 (FIG. 3) to the first display region 21, the collision heart rate middle stage image 212 (FIG. 6) to the third display region 22, and the time lower stage image 213 (FIG. 5) to the second display region 23.

After the processing in S3, the image collision determination means 13 determines whether or not the images allocated in S2 collide (interfere) with each other with use of the item management table 250 (FIG. 12) (S4). For example, the image collision determination means 13 determines that the collision heart rate middle stage image 212 "collides" because the collision heart rate middle stage image 212 "occupies" a region of the steps/heart rate/calorie upper stage image 211 in the "upper stage" of the rim part. Also, the image collision determination means 13 determines that the collision heart rate middle stage image 212 "collides" because the collision heart rate middle stage image 212 "occupies" a region of the time lower stage image 213 in the "lower stage" of the rim part.

In a case in which collision (interference) is determined (collision in S4), the display mode change means 14 changes the display mode of the image item determined to collide with reference to the item management table 250 (S5). For example, the display mode change means 14 changes the collision heart rate middle stage image 212 (FIG. 6) to the collision avoidance heart rate middle stage image 222 (FIG. 10). That is, the display mode change means 14 changes the display mode from the heart rate gauge 212*b* (FIG. 6) to the heart rate gauge 222*b* (FIG. 10).

After the processing in S5, or in a case in which it is determined that there is no collision (no collision in S4), the display control means 15 displays on the display 20 an image whose display mode has been changed or an image determined to have no collision (S6). This ends the processing.

For example, JP 2015-127957A, which has been filed for a patent in Japan, discloses a technique for dividing a display range of a display into a plurality of regions and displaying information in each of the regions. Here, in a case in which the display range of the display is divided into regions having different sizes or shapes, it may be difficult to recognize information in some of the displayed regions. Also, depending on the type of information to be displayed and the size or shape of the displayed region, there may be a problem in which the displayed information does not fit into the region.

However, as described above, with the electronic device 100 according to the present embodiment, in a case in which the heart rate gauge 212*b* of the collision heart rate middle stage image 212 (FIG. 6) collides with the steps/heart rate/calorie upper stage image 211 (FIG. 3) and the time lower stage image 213 (FIG. 5) as in the heart rate collision image 210 (FIG. 9), the display mode change means 14 changes the display mode from the collision heart rate middle stage image 212 (FIG. 6) to the collision avoidance heart rate middle stage image 222 (FIG. 10).

This enables collision to be avoided and allows the user to easily look at the steps/heart rate/calorie upper stage image 211 (FIG. 3) and the time lower stage image 213 (FIG. 5).

On the other hand, in a case in which the user selects an image to be arranged in the first display region 21 and an image to be arranged in the second display region 23 so as not to collide with the collision heart rate middle stage image 212 arranged in the third display region 22, the heart rate gauge 212b is displayed large enough to protrude into the first rim part 21c and the second rim part 23c, which are other regions. As a result, the display range of the display 20 is effectively utilized, and the heart rate gauge 212b is easy for the user to look at.

Modification Examples

The present invention is not limited to the above-described embodiment and can be modified in various ways as in the following examples. (1) In the above embodiment, although the display mode is changed from the heart rate gauge 212b (FIG. 6) to the heart rate gauge 222b (FIG. 10), the graphic display and the related information may be exchanged, or the graph and the gauge may be exchanged.

Figure 14:
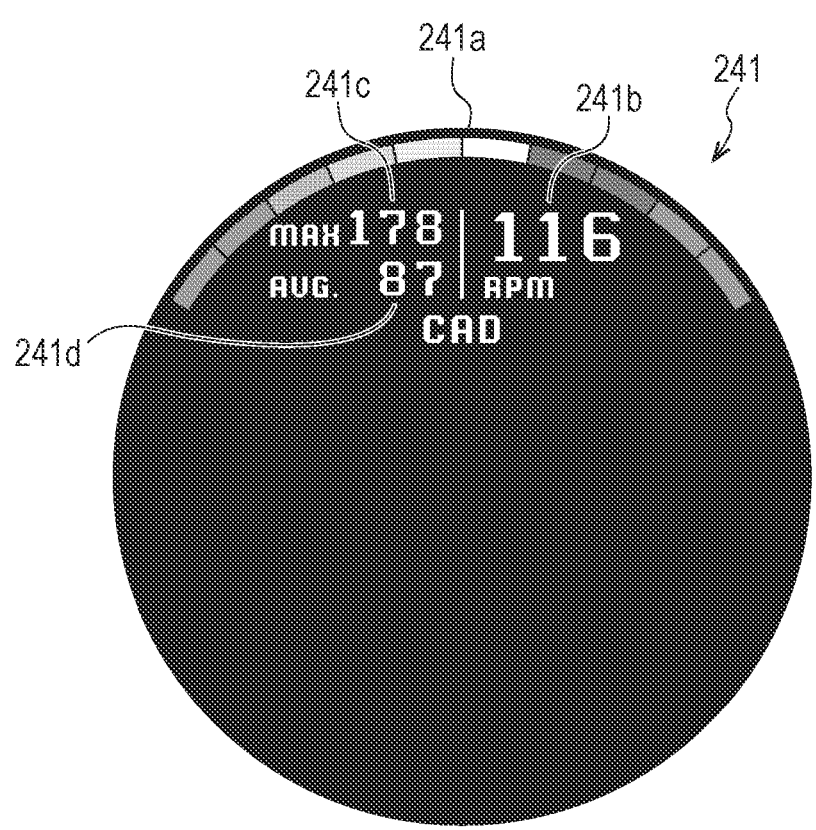
FIG. 14 is a diagram illustrating an example of the upper stage image in which a graphic image is arranged at a rim part.

FIG. 14 illustrates an example of an upper stage image in which a graphic image is arranged at the rim part.

A cadence upper stage image 241 includes a heart rate gauge 241a arranged at the first rim part 21c (FIG. 2), and a heart rate number element 241b, a maximum value number element 241c for cadence, and an average value number element 241d for cadence serving as related information.

The graph heart rate upper stage image 231 in FIG. 7 includes the heart rate graph 231b and the related information (heart rate number element 231a) arranged at the first rim part 21c. Therefore, in FIG. 14, the heart rate number element 241b is arranged at the position in FIG. 7 provided with the heart rate graph 231b, and the heart rate gauge 241a is arranged at the position in FIG. 7 provided with the heart rate number element 231a. Therefore, the graphic display for the heart rate and the related information for the heart rate are exchanged between the cadence upper stage image 241 in FIG. 14 and the graph heart rate upper stage image 231 in FIG. 7.

Also, the heart rate gauge 241a is arranged in the cadence upper stage image 241 in FIG. 14, and the heart rate graph 231b is arranged in the graph heart rate upper stage image 231 in FIG. 7. That is, the gauge and the graph for the heart rate are exchanged between the cadence upper stage image 241 in FIG. 14 and the graph heart rate upper stage image 231 in FIG. 7.

(2) Although the electronic device 100 according to the above embodiment is a wristwatch-type mobile device (smart watch), the electronic device 100 may be a personal computer (PC), a smartphone, or the like. At this time, the information acquisition sensor is not limited to an interface such as a universal serial bus (USB) connected to the sensor and may be included in the control unit 10 as a functional unit configured to acquire information from a memory (nonvolatile storage unit), for example. Also, the display range of the display 20 is not circular but rectangular.

The invention claimed is:

1. An electronic device comprising:
a display configured to perform display in a display range;
an information acquisition sensor; and
at least one processor, the processor being configured to:
allocate information acquired from the information acquisition sensor to be displayed in one of a plurality of display regions within the display range of the display;
control a display mode of the information to be different between (i) a case in which the information is to be displayed in a first display region, from among the plurality of display regions, which is provided at one end side of the display and which includes a first divided region and a second divided region, and (ii) a case in which the information is to be displayed in a second display region, from among the plurality of display regions, which is provided at the other end side of the display and which includes a third divided region and a fourth divided region; and
control the display mode of the information such that a display content to be displayed in the first divided region corresponds to a display content to be displayed in the fourth divided region, and such that a display content to be displayed in the second divided region corresponds to a display content to be displayed in the third divided region.

2. The electronic device according to claim 1, wherein:
the display range is substantially circular,
the first divided region is provided at a position farther from a center of the display range than the second divided region, and
the fourth divided region is provided at a position farther from the center of the display than the third divided region.

3. The electronic device according to claim 1, wherein:
the first display region has a substantially same shape as the second display region,
the first divided region has a substantially same shape as the fourth divided region, and
the second divided region has a substantially same shape as the third divided region.

4. The electronic device according to claim 1, wherein:
the first display region has a substantially same size as the second display region,
the first divided region has a substantially same size as the fourth divided region, and
the second divided region has a substantially same size as the third divided region.

5. The electronic device according to claim 1, wherein:
the information comprises at least first information and second information, and
the processor is configured to switch display of the information between the first display region and the second display region under a condition that the first information and the second information are associated with each other.

6. The electronic device according to claim 5, wherein the processor is configured to control the display mode of the information by changing a relative display position of the first information and the second information to be different between the case in which the information is to be displayed in the first display region and the case in which the information is to be displayed in the second display region.

7. The electronic device according to claim 5, wherein:
the first information is information of a graphic element,
the second information is related information related to the information of the graphic element, and
the processor is configured to:
control the related information to be displayed in the first divided region and control the information of the graphic element to be displayed in the second divided region in the case in which the information is to be displayed in the first display region, and control the related information to be displayed in the fourth divided region and control the information of the graphic element to be displayed in the third divided region in the case in which the information is to be displayed in the second display region.

8. The electronic device according to claim 1, wherein:

the plurality of display regions further include a third display region provided between the first display region and the second display region, and the processor is configured to change, based on a result of a determination that a collision occurs between any two of an image to be displayed in the first display region, an image to be displayed in the third display region, and an image to be displayed in the second display region, a display mode of at least one of the image to be displayed in the first display region, the image to be displayed in the third display region, and the image to be displayed in the second display region such that the collision is not generated.

9. The electronic device according to claim 1, wherein the display range is non-rectangular.

10. The electronic device according to claim 1, wherein the display range is rectangular.

11. An electronic device control method executed by a processor of an electronic device including a display configured to perform display in a display range and an information acquisition sensor, the electronic device control method comprising:

allocating information acquired from the information acquisition sensor to be displayed in one of a plurality of display regions within the display range of the display;

controlling a display mode of the information to be different between (i) a case in which the information is to be displayed in a first display region, from among the plurality of display regions, which is provided at one end side of the display and which includes a first divided region and a second divided region, and (ii) a case in which the information is to be displayed in a second display region, from among the plurality of display regions, which is provided at the other end side of the display and which includes a third divided region and a fourth divided region; and controlling the display mode of the information such that a display content to be displayed in the first divided region corresponds to a display content to be displayed in the fourth divided region, and such that a display content to be displayed in the second divided region corresponds to a display content to be displayed in the third divided region.

12. A non-transitory computer-readable recording medium storing a program which is executable by a computer of an electronic device including a display configured to perform display in a display range and an information acquisition sensor to control the computer to execute functions comprising:

allocating information acquired from the information acquisition sensor to be displayed in one of a plurality of display regions within the display range of the display;

controlling a display mode of the information to be different between (i) a case in which the information is to be displayed in a first display region, from among the plurality of display regions, which is provided at one end side of the display and which includes a first divided region and a second divided region, and (ii) a case in which the information is to be displayed in a second display region, from among the plurality of display regions, which is provided at the other end side of the display and which includes a third divided region and a fourth divided region; and controlling the display mode of the information such that a display content to be displayed in the first divided region corresponds to a display content to be displayed in the fourth divided region, and such that a display content to be displayed in the second divided region corresponds to a display content to be displayed in the third divided region.

* * * * *